United States Patent [19]

Eriksson et al.

[11] Patent Number: 5,493,228
[45] Date of Patent: Feb. 20, 1996

[54] METHOD AND DEVICE FOR MEASURING AND RECREATING THE LOAD CURRENT IN A POWER NETWORK IN CONNECTION WITH THE OCCURRENCE OF FAULTS

[75] Inventors: Leif Eriksson, Sala; Murari M. Saha, Västerås, both of Sweden

[73] Assignee: ASEA Brown Boveri AB, Vasteras, Sweden

[21] Appl. No.: 311,124

[22] Filed: Sep. 23, 1994

[30] Foreign Application Priority Data

Sep. 28, 1993 [SE] Sweden .................... 9303154

[51] Int. Cl.⁶ ........................ G01R 31/14
[52] U.S. Cl. ............... 324/522; 324/509; 324/111; 324/521; 361/79; 361/87
[58] Field of Search .................. 324/120, 509, 324/510, 522, 111, 521; 361/87, 79

[56] References Cited

U.S. PATENT DOCUMENTS

| | | | |
|---|---|---|---|
| 4,529,929 | 7/1985 | Berggren | 324/509 |
| 4,694,402 | 9/1987 | McEachern | 324/102 |
| 4,795,983 | 1/1989 | Crockett | 324/509 |
| 4,878,142 | 10/1989 | Bergman | 324/509 |

OTHER PUBLICATIONS

"An Accurate Fault Locator . . . ", IEEE Transactions on Power Apparatus and Systems, vol. PAS–104, No. 2, Feb. 1985, pp. 424–436.
"High–Speed Distance Relaying . . . ", IEEE Transactions on Power Apparatus and Systems, vol. 91, No. 3, May/Jun. 1972, pp. 1235–1243.

Primary Examiner—Kenneth A. Wieder
Assistant Examiner—Jose M. Solis
Attorney, Agent, or Firm—Watson, Cole, Grindle & Watson

[57] ABSTRACT

A method and a device, after a fault has occurred in a power network, for measuring and recreating the phase currents $I_B$ prior to the occurrence of the fault by determining continuously, starting from sampled measured values of the phase currents up to the time of the fault for each phase, the amplitude I and the phase angle $\phi$ of the phase currents based on two consecutive sampled measured values, whereupon a comparison is made between the last determined value $I_k$ obtained and the rated current $I_n$ of the power network. If $I_k$ is greater than $I_n$, it is considered that a fault has occurred and the phase currents prior to the fault are indicated as $I_B = I_{k-1} \cdot \sin(\phi_{k-1} + \omega(t - t_{k-1}))$.

5 Claims, 1 Drawing Sheet

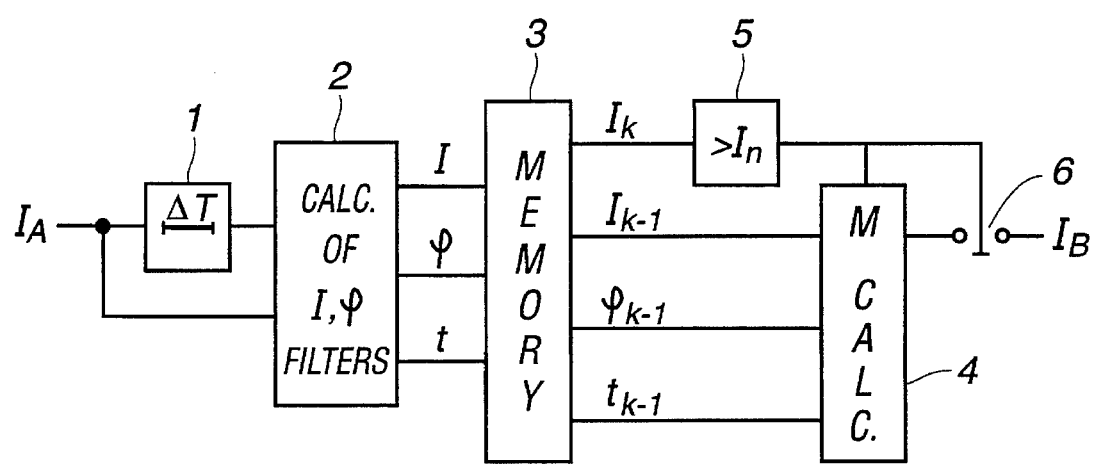

METHOD AND DEVICE FOR MEASURING AND RECREATING THE LOAD CURRENT IN A POWER NETWORK IN CONNECTION WITH THE OCCURRENCE OF FAULTS

TECHNICAL FIELD

For protection of cables and overhead lines, normally so-called distance protections are used. These protections are often based on the impedance principle, that is, they indicate a fault when the quotient of voltage and current measured at a measuring point is lower than a pre-set value. Besides being able to indicate faults, these protections also have other properties which extend the protective effect, such as directional and reach properties. Furthermore, they can be used for determining the distance from a measuring station to a possible fault and can also determine the magnitude of the fault resistance.

BACKGROUND ART, DISCUSSION OF THE PROBLEM

To be able to place the invention in its proper context and also to be able to demonstrate the value of the invention, a relatively detailed description of the state of the art as regards the use of a distance protection as a fault locator, and of the problems which are associated with the current technique within this field, will first be given. In this connection it is extremely important to have access to a measure of the load current prior to the occurrence of a fault.

The basic criterion for tripping of a power transmission line, in which a distance protection based on the impedance principle is used, is based on a check whether $$|Z|=|U_A/I_A|<Z_{in} \qquad (1)$$

that is, whether the numerical value of the impedance determined with the aid of phase voltage $U_A$ and phase current $I_A$ is smaller than a preset value $Z_{in}$. This check can suitably be performed with a common underimpedance relay with a setting $Z_{in}$ lower than the normal load impedance.

When the distance protection is to be used as a fault locator, however, a considerable extension of the basic concept is required to achieve the desired accuracy and speed in the evaluation when a fault has occurred on the power transmission line.

Most fault locators are based on measuring the reactance between a short-circuit and that end of the power transmission line where the fault locator is placed. However, the accuracy in the distance calculation is influenced by the fault resistance. The reason for this is that the current which flows through the fault resistance is somewhat offset in phase in relation to the phase position of the current measured at the end of the power transmission line. This means that the fault resistance is interpreted as an apparent impedance with one resistive and one reactive component. It is, among other things, this reactive component which gives rise to the inaccuracy or the fault in the distance calculation since it influences the measured reactance.

The principles of fault location and calculation of fault resistance in connection with the occurrence of a fault on a protected line distance are known from a plurality of publications, some of which will be described below. The basic material consists of measured values obtained with the aid of instrument transformers for voltage and current at a measuring station adjacent to the protected line. These measured values are applied to a model of the network in question, which model is built into the distance protection. The current technique comprises A-D conversion and filtering of the measured values which then, via different distance protection equations for the model, determine the distance to the fault and the magnitude of the fault resistance.

A fault locator is described in an article entitled "An accurate fault locator with compensation for apparent reactance in the fault resistance resulting from remote-end infeed" published in IEEE Transaction on PAS, Vol. PAS-104, No. 2, February 1985, pp 424–436. Besides taking into account the impedance $Z_1$ of the power transmission line, this fault locator also takes into account the source impedances of the power transmission line to be able correctly to describe the network and the effect of feeding to the fault point of current from both directions. According to this method, sampled phase currents $I_R$, $I_S$ and $I_T$, measured at a measuring station A at one end of the line and designated $I_A$ below, are memorized to be able to determine the change in the phase currents at the measuring station which arises when a fault occurs, that is, the current change $I_{FA}$ equal to the present phase current $I_A$ after the occurrence of a fault less the phase current prior to the occurrence of the fault. The method of obtaining a measure of the current change $I_{FA}$ described above requires an extensive memory capacity and the method of calculation is relatively time-consuming.

Because the current $I_F$ which flows through the fault resistance has a current contribution also from a supply station at the other end of the power transmission line, $I_F$ will be different from $I_{FA}$. The relationship between these can be determined with the aid of the distribution factor of the network. The equations which can be set up in this way allow a possibility of determining both the current $I_F$ through the fault, the fault resistance and the distance to the fault.

Obtaining a measure of the current $I_F$ through the fault with the methods described above requires, as mentioned above, a considerable memory capacity, and because the method of calculation is relatively extensive, this is not a method which can be used when heavy demands are placed on fast protective functions. The reason for this is, among other things, that currents both prior to and after the occurrence of a fault must undergo a time-consuming Fourier filtering to obtain the fundamental components of the currents, freed from harmonics and d.c. components.

Swedish patent application SE 9203071-7 describes a fault model of a line network, which also takes into account the zero-sequence impedance of the network in that also the sum current $I_N$, also called ground current, that is, $$I_N=I_R+I_S+I_T=3\cdot I_0 \qquad (2)$$

where $I_R$, $I_S$ and $I_T$ are the respective phase currents and $I_0$ is the zero-sequence current, will be included in the equations which can be set up to determine the fault parameters.

Although, in principle, having access to the parameters of the network and the phase currents $I_A$ and $I_F$ and $I_N$, it is now possible to determine the distance to a fault and the fault resistance, one practical problems remains, however, namely, as rapidly as possible after the occurrence of a fault, obtaining a sufficiently correct value of the phase currents immediately before and after the fault has occurred such that the desired accuracy in determining the fault parameters can be obtained.

Other methods for amplitude determination of the measured currents are also available. One such method comprises finding out the peak value with the aid of two consecutive sampled values for each cycle. Such a method is described, inter alia, in "High-speed distance relaying using a digital computer, Part 1—System Description", IEEE Trans on Power Apparatus and Systems, Vol-91, No. 3, May/June 1972, pp 1235–1243 by G. B. Gilchrest, G. D. Rockefeller and E. A. Udren. The peak values which are obtained in this way under normal conditions, that is, before the occurrence of a possible saturation of the current transformers, are relevant measured values which correspond to the Fourier amplitudes.

SUMMARY OF THE INVENTION

The present invention relates to a method and a device for measuring and recreating, rapidly after the occurrence of a fault in a power network, the phase currents prior to the occurrence of the fault. This allows a possibility of rapidly determining the change in current which arises in connection with the occurrence of a fault. This change constitutes a measure of the fault current which is used when calculating the distance to the fault, the fault resistance, etc.

In a first step there are calculated continuously, starting from the phase currents $I_A$ up to the time of the fault for each phase, the amplitude value I and the phase position $\phi$ of the currents, based on two consecutive sampled measured values, according to some known method, for example according to the method mentioned above. The amplitude value is then filtered in a low-pass filter, whereupon a continuous comparison is made between the latest value $I_k$ obtained in this way and the present rated current $I_n$ of the power network. If the comparison shows that the value obtained exceeds the rated current, that is, indicates that a fault has occurred, the amplitude value $I_{k-1}$ and the phase position $\phi_{k-1}$, which were calculated immediately prior to the fault, as well as the corresponding time $t_{k-1}$, are stored.

The phase current $I_B$ for each phase prior to the occurrence of a fault is now determined in accordance with the invention starting from the values $I_{k-1}$, $\phi_{k-1}$ and $t_{k-1}$, obtained in this way, as follows:

$$I_B = I_{k-1} \cdot \sin(\phi_{k-1} + \omega(t - t_{k-1})) \tag{3}$$

which in turn means that as fault current during the following calculations of the distance to the fault, the fault resistance, etc., the following is used $$I_{FB} = I_A - I_B \tag{4}$$

The great advantage of this way of obtaining a measure of the phase currents prior to the occurrence of a fault is that no extensive memory capacity is needed for continuous storage of measured values, and that the necessary time for the determination is considerably shorter than with the methods previously described. Since the time aspect in this context is extremely important, this method means that information that a fault has occurred and data about the fault, the distance to the fault, etc., can be obtained much faster.

DESCRIPTION OF THE DRAWINGS

The drawing is a schematic block diagram of an apparatus for carrying out the method according to the present invention.

DESCRIPTION OF THE PREFERRED EMBODIMENTS

A device for carrying out the method according to the invention is shown in the accompanying drawing. A corresponding device is included in each phase. The amplitude I and phase angle $\phi$ of the phase current based on two consecutive samples are determined continuously with the aid of some known technique. This can be done with the aid of a first time-lag device 1 and a first calculating unit 2. In this calculating unit, a low-pass filtering of the amplitude value of I, calculated in this way, is also performed.

Each new, calculated value $I_k$, $\phi_k$ as well as the corresponding time $t_k$ and the immediately preceding amplitude value $I_{k-1}$, the phase position $\phi_{k-1}$ and the corresponding time $t_{k-1}$ are stored continuously in a memory unit 3. These immediately preceding, consecutively stored values are then forwarded to a memory and calculating unit 4.

Detection whether a fault has occurred now takes place by comparing the last calculated amplitude value $I_k$ with the present rated current $I_n$ of the power network. This comparison takes place in a comparison device 5. If now $I_k$ is greater than $I_n$, this means that a fault has occurred on the power line. This information is passed to the memory and calculating unit 4 which locks and stores the immediately preceding amplitude value $I_{k-1}$ and the corresponding phase position $\phi_{k-1}$ and time $t_{k-1}$.

In the memory and calculating unit 4 a determination of a value of the phase currents prior to the occurrence of the fault is then performed in accordance with the invention, that is, $$I_B = I_{k-1} \cdot \sin(\phi_{k-1} + \omega(t - t_{k-1})) \tag{3}$$

Since the time of calculation for obtaining the above value of the phase currents is practically negligible, as soon as a fault has been detected by means of the comparison device 5, an order is given to connect this value via a contact 6 to the distance protection for the further processing, that is, determining the fault current and obtaining the distance to the fault, etc.

The embodiment described above with reference to the accompanying drawing can be varied in many ways within the scope of the invention, for example with discrete components in a hybrid design, with mixed analogue and digital technique, in a more or less integrated way, designed as software, or in any other corresponding way.

We claim:

1. A method, after the occurrence of a fault in a power network, of measuring and recreating the phase currents ($I_B$) prior to the occurrence of the fault, comprising the steps of: sampling the phase currents;

low pass filtering the phase currents;

determining low-pass filtered values of the amplitude I and the phase position $\phi$ of the phase currents from two consecutive, sampled measured values of the phase currents $I_A$ including a last determined value $I_k$, $\phi_k$ obtained, as well as a corresponding time $t_k$ therefor, and an immediately preceding determined value $I_{k-1}$ and $\phi_{k-1}$ as well as a corresponding time $t_{k-1}$ therefor;

storing $I_k$, $I_{k-1}$, $\phi_k$, $\phi_{k-1}$, $t_k$ and $t_{k-1}$;

comparing $I_k$ with a rated current $I_n$ of the power network;

calculating $I_B$ as a function of the immediately preceding determined value $I_{k-1}$; and determining that a fault is considered to have been detected if the last determined value $I_k$ is greater than the rated current $I_n$ of the power network, and that as a measure of the phase currents prior to the occurrence of the fault $$I_B = I_{k-1} \cdot \sin(\phi_{k-1} + \omega(t - t_{k-1})).$$

2. A device for carrying out the method according to claim 1 of recreating the phase currents ($I_B$) in a power network prior to the occurrence of a fault, wherein the device, has access to sampled values of the present phase current $I_A$, for each phase comprising:

- a first time-lag unit and a first calculating unit responsive to the phase currents, which together are adapted to determine low pass filtered values of the amplitude I and the phase angle $\phi$ of the phase current on two consecutive samples;
- a memory unit adapted to consecutively store the last calculated value of the phase current $I_k$, the phase angle $\phi_k$ and the corresponding time $t_k$ and the immediately preceding value of the phase current $I_{k-1}$, the phase angle $\phi_{k-1}$ and the corresponding time $t_{k-1}$;
- a comparison device for comparing the last calculated value of the phase current $I_k$ with the rated current $I_n$ of the power network and whether the phase current $I_k$ is greater than the rated current $I_n$ of the power network;
- a memory and calculating unit for storing the immediately preceding value of the phase current $I_{k-1}$, the phase angle $\phi_{k-1}$ and the corresponding time $t_{k-1}$ and for determining a value of the phase current prior to the occurrence of the fault in accordance with the relation $$I_B = I_{k-1} \cdot \sin(\phi_{k-1} + \omega(t - t_{k-1}));$$

and

- an output device responsive to the memory and calculating unit including a switchable contact being operative when the fault has occurred, for providing a foundation for determining the fault parameters.

3. A device for recreating the phase currents ($I_B$) in a power network prior to the occurrence of a fault, having access to sampled values of the present phase current $I_A$, for each phase comprising:

- a time-lag unit for providing an output of successive signals of phase currents;
- a first calculating unit including a low pass filter responsive to the signals for determining low pass filtering values of amplitude I and phase angle $\phi$ of the phase current upon two consecutive samples of said signals;
- a memory unit responsive to the samples for consecutively storing a last calculated value of the phase current $I_k$, a phase angle $\phi_k$ and corresponding time $t_k$ and an immediately preceding value of phase current $I_{k-1}$, phase angle $\phi_{k-1}$ and corresponding time $t_{k-1}$;
- a comparison device responsive to $I_k$ and a rated current value $I_n$ of the power network for comparing the last calculated value of the phase current $I_k$ with the rated current $I_n$ and providing an output when the last calculated value of the phase current $I_k$ is greater than the rated current $I_n$;
- a second calculating unit responsive to the memory unit for storing the immediately preceding value of the phase current $I_{k-1}$, the phase angle $\phi_{k-1}$ and the corresponding time $t_{k-1}$ for providing a value of the phase current prior to the occurrence of the fault in accordance with $$I_B = I_{k-1} \cdot \sin(\phi_{k-1} + \omega(t - t_{k-1})),$$

wherein the value of phase current comprises a foundation parameter for determining fault parameters.

4. The device of claim 3 further including a contact responsive to the calculating unit and comparison device operative upon the occurrence of a fault for carrying the foundation parameter.

5. The device of claim 4 wherein the contact closes in response to a fault.

* * * * *